T. C. BURNHAM.
COTTON-CHOPPER.

No. 180,195. Patented July 25, 1876.

WITNESSES:
E. Wolff
John Goethals

INVENTOR:
T. C. Burnham
BY
ATTORNEYS.

UNITED STATES PATENT OFFICE.

THEODORE C. BURNHAM, OF BURNET, TEXAS.

IMPROVEMENT IN COTTON-CHOPPERS.

Specification forming part of Letters Patent No. 180,195, dated July 25, 1876; application filed March 25, 1876.

*To all whom it may concern:*

Be it known that I, THEODORE C. BURNHAM, of Burnet, in the county of Burnet and State of Texas, have invented a new and Improved Cotton-Chopper, of which the following is a specification:

The essential feature of my improved cotton-chopper is a contrivance of choppers on vertical rock-shafts, with a cam-wheel attached to one of the truck-wheels, for closing them, and a spring for opening them, upon the row of plants, for chopping them out.

Figure 1:
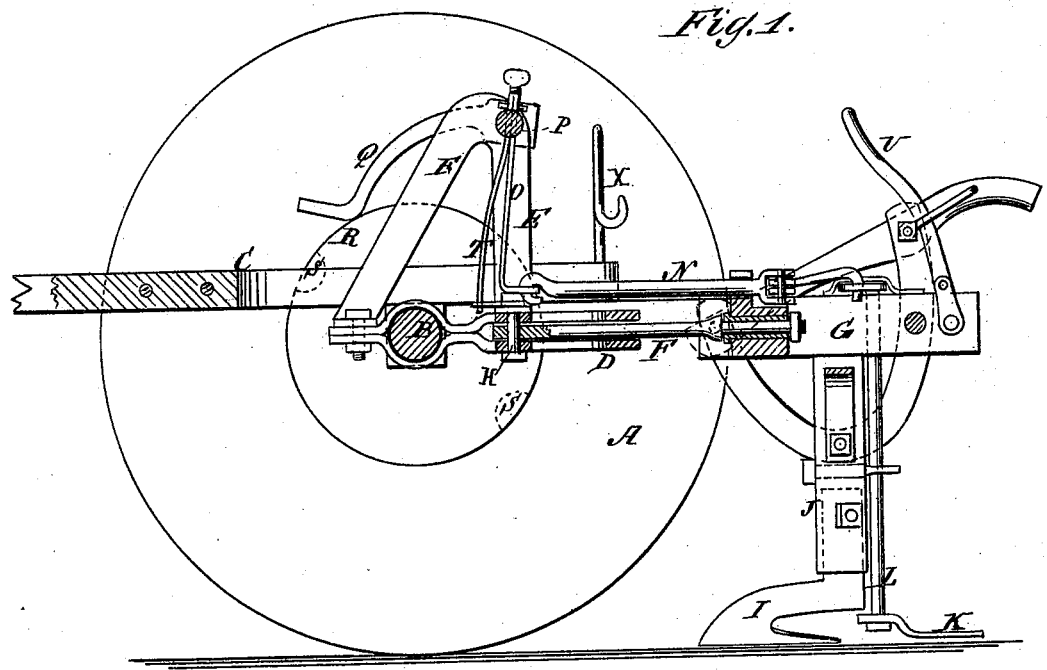
Figure 2:
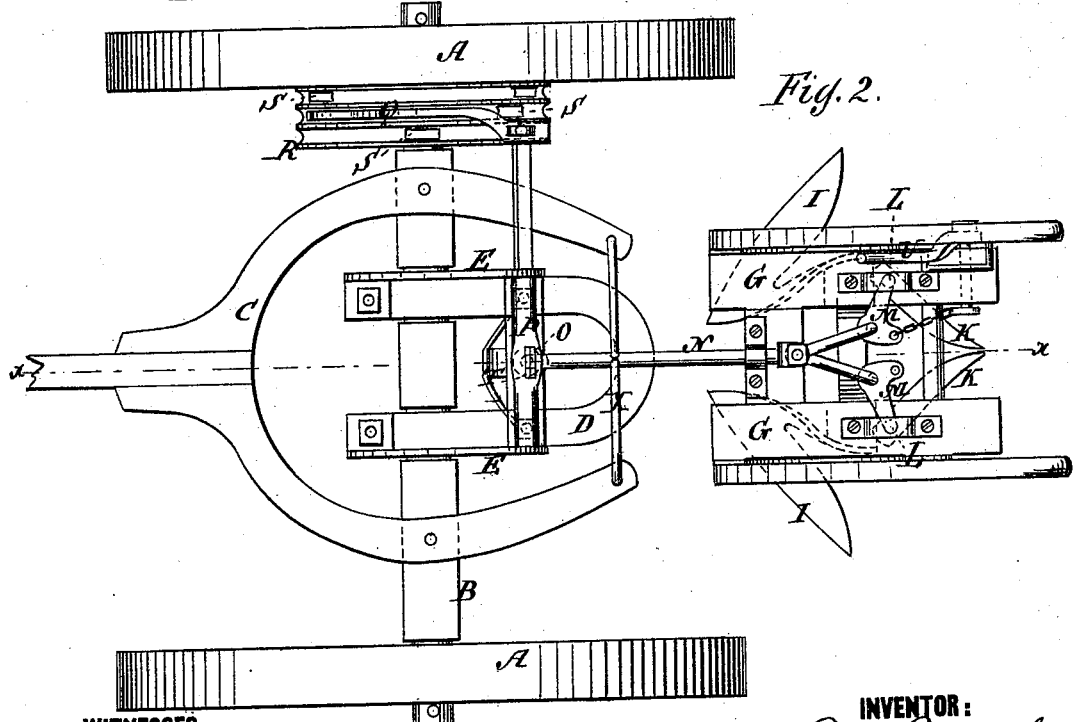

Figure 1 is a longitudinal sectional elevation of my improved cotton-chopper taken on the line $x\,x$ of Fig. 2. Fig. 2 is a plan view.

Similar letters of reference indicate corresponding parts.

A represents the truck-wheels; B, the axle; C, the tongue, to be contrived in any approved arrangement. D is a U-shaped frame, the forked front ends of which embrace the axle B at two points, to form two bearings, said frame D having an upright frame, E, mounted on it; also, having the reach F pivoted to it at H, to draw the chopper and scraper-frame G, which carries the scrapers I at the bottom of the standard J, and the choppers K on the vertical rock-shafts L. The rock-shafts are connected at the upper end by arms M, rod N, arm O, and rock-shaft P, with the lever Q, which runs on the cam R, which keeps the choppers closed until the lever drops into the depressions S, when the spring T forces the rod N back and opens the choppers to allow them to pass by the plants desired to be retained. The arm O is also a spring, and it allows the rod N to be pulled back and the cutters to be opened by the hand-lever U, when it may be desired to keep them open longer than the depressions of the cam will allow.

The cam is made in three different parts, with the depressions arranged at different distances apart, for making the hills more or less distant from each other, according to the nature of the case.

X is a hook, on which to hang the frame G by reach F, when the scrapers and choppers are to be carried above the ground.

Having thus described my invention, I claim as new and desire to secure by Letters Patent—

1. The combination of the lever U with the rock-shaft L, rod N, spring-arm O, rock-shaft P, arm Q, and the cam R, substantially as specified.

2. The combination of the U-shaped frame D and vertical frame E with the axle B, chopper-operating devices, and pivoted reach F, as and for the purpose set forth.

THEODORE C. BURNHAM.

Witnesses:
 JOSEPH ATKINSON,
 J. A. CREMS.